United States Patent

Danzuka et al.

[11] Patent Number: 4,765,815
[45] Date of Patent: Aug. 23, 1988

[54] METHOD FOR PRODUCING GLASS PREFORM FOR OPTICAL FIBER

[75] Inventors: Toshio Danzuka; Hiroshi Yokota; Yoichi Ishiguro, all of Yokohama, Japan

[73] Assignee: Sumitomo Electric Industries, Ltd., Osaka, Japan

[21] Appl. No.: 88,542

[22] Filed: Aug. 20, 1987

Related U.S. Application Data

[63] Continuation of Ser. No. 748,563, Jun. 25, 1985, abandoned.

[30] Foreign Application Priority Data

Jul. 13, 1984 [JP] Japan .................. 59-144158

[51] Int. Cl.$^4$ ........................................... C03B 37/018
[52] U.S. Cl. ........................................ 65/3.12; 65/3.2; 65/18.2
[58] Field of Search ............ 65/18.2, 3.12, 11.1, 65/3.11, 3.1, 3.2, 3.41, 157, 144, 2

[56] References Cited

U.S. PATENT DOCUMENTS

| | | | |
|---|---|---|---|
| 3,806,224 | 4/1974 | MacChesney et al. | 65/3.12 |
| 3,957,474 | 5/1976 | Kobayashi et al. | 65/3.12 |
| 4,062,665 | 12/1977 | Izawa et al. | 65/3.12 |
| 4,135,901 | 1/1979 | Fujiwara et al. | 65/3.12 |
| 4,224,046 | 9/1980 | Izawa et al. | 65/18.2 |
| 4,310,339 | 1/1982 | Plankenship | 65/3.12 |
| 4,378,985 | 4/1983 | Powers | 65/18.2 X |
| 4,552,576 | 11/1985 | Hara et al. | 65/3.12 |
| 4,568,370 | 2/1986 | Powers | 65/3.12 |

FOREIGN PATENT DOCUMENTS

| | | | |
|---|---|---|---|
| 51-42546 | 4/1976 | Japan | 65/3.12 |
| 53-13618 | 2/1978 | Japan | 65/3.12 |
| 53-27039 | 3/1978 | Japan | 65/3.12 |
| 54-02653 | 2/1979 | Japan | 65/3.12 |

Primary Examiner—Kenneth M. Schor
Attorney, Agent, or Firm—Cushman, Darby & Cushman

[57] ABSTRACT

A method for producing a glass preform for an optical fiber by means at least two burners, comprising jetting a glass raw material containing $SiCl_4$ from the first center burner and a hydrogen-containing silicon compound with larger reaction heat than $SiCl_4$ from at least one second burner, flame hydrolyzing the glas raw material to synthesizing fine glass particles, depositing the fine glass particles on a starting member to form a porous soot preform and heating and sintering the soot preform to obtain a transparent glass preform, by which a large preform is stably produced and a bulk density of the preform is easily controlled.

2 Claims, 2 Drawing Sheets

METHOD FOR PRODUCING GLASS PREFORM FOR OPTICAL FIBER

This is a continuation of application Ser. No. 748,563, filed June 25, 1985, which was abandoned upon the filing thereof.

FIELD OF THE INVENTION

The present invention relates to a method for producing a glass preform for an optical fiber. More particularly, it relates to a method for producing a glass preform from silicon compounds by means of at least two burners.

BACKGROUND OF THE INVENTION

A vapor phase method for producing a glass preform for an optical fiber generally comprises jetting, from a burner, a mixture of a fuel gas, a glass raw material and optionally an additive for adjusting a refractive index of the produced galas preform, flame hydrolyzing the glass raw material in an oxyhydrogen flame to synthesize fine glass particles, depositing the fine glass particles on a rotating starting member to form a porous soot preform and then heating and sintering the porous soot preform to obtain a transparent glass preform. Usually, the fuel gas comprises a mixture of hydrogen and oxygen, the glass raw material comprises $SiCl_4$, and the additive comprises $GeCl_4$, $POCl_4$ $BBr_3$, etc. To increase a production rate and a size of the porous soot preform, two or more burners may be used in the vapor phase method.

Hitherto, when two or more burner are used in the conventional vapor phase method, it is rather difficult to control a bulk density of the fine glass particle mass deposited in the periphery of the soot preform and to increase yield.

Usually, the first center burner forms a flame so as to enclose a center portion of a surface of the soot preform on which the fine glass particles are being deposited (hereinafter referred to as "depositing surface"). However, the second burner(s) can heat only a part of the depositing surface since its flame cannot enclose the whole depositing surface as shown in FIG. 1, in which two burners are used for simplicity, and numeral 11 stands for a burner for forming a center portion of the porous soot preform, 12 stands for a burner for forming a peripheral portion of the soot preform, and 13 and 14 stand for regions which are heated by the burners 11 and 12, respectively. Since the soot preform is pulled up with rotation, some peripheral portions are not heated for a certain period of time so that the depositing surface is not sufficiently heated. Thus, the bulk density of the glass particle mass deposited in the peripheral portion becomes low, which tends to cause cracks.

When the flame stream is spread so as to increase the bulk density of the glass particles deposited on the periphery of the soot preform, convergence of the flame is decreased and the temperature of the center of the flame stream is lowered so that the production rate of the glass particles is deteriorated or the temperature of the fine glass particles is not sufficiently raised, which result in the decrease of the yield. When the flow rate of hydrogen is simply increased so as to raise the flame temperature and in turn the temperature of the depositing surface, interference between the burners induces the minimum point in a bulk density distribution as shown in FIG. 2, which causes the crack in the porous soot preform.

Thus, when two or more burners are used for synthesizing the fine glass particles in the production of the porous soot preform, the flow condition in the second burner(s) are so selected that the reaction rate of the glass raw material is increased, the temperature of the fine glass particles is raised, and the yield of the fine glass particles is improved and simultaneously that the flame formed by the burner(s) is controlled so as to obtain a stable distribution of the bulk density of the porous soot preform.

When $SiCl_4$ is used as the glass raw material, the fine glass particles are synthesized according to the following equation:

$$SiCl_4 + 2H_2O \rightarrow SiO_2 + 4HCl \qquad (I)$$

Although this reaction is exothermic, it should be promoted by heat evolved by the oxyhydrogen flame since its reaction heat is as small as 24 kcal/mol. Thus, the synthesizing rate of the fine glass particles depends on the quantitiy of heat conducted from the flame and, consequently, the temperature distribution in the stream of the fine glass particles depends on the heat of the flame. Namely, when $SiCl_4$ alone is used as the glass raw material, the flame formed by the burner contributes to the synthesis of the fine glass particles, heating of the synthesized fine glass particles and heating of the depositing surface of the porous soot preform. Therefore, conditions under which a large porous soot preform is stably produced with good yield and any one of the above described drawbacks is not encountered are very restricted.

SUMMARY OF THE INVENTION

One object of the present invention is to provide a method for producing a glass preform for an optical fiber, by which a large porous soot preform is stably produced by means of at least two burners.

Another object of the present invention is to provide a method for producing a glass preform for an optical fiber, by which a bulk density of the porous soot preform is easily controlled.

Further object of the present invention is to provide a method for producing a glass preform for an optical fiber, by which a deposition yield of the glass raw material is improved.

Accordingly, the present invention provides a method for producing a glass preform for an optical fiber by means at least two burners, comprising jetting a glass raw material containing $SiCl_4$ from the first center burner and a hydrogen-containing silicon compound with larger reaction heat than $SiCl_4$ from at least one second burner, flame hydrolyzing the glass raw material to synthesizing fine glass particles, depositing the fine glass particles on a starting member to form a porous soot preform and heating and sintering the soot preform to obtain a transparent glass preform.

DETAILED DESCRIPTION OF THE INVENTION

Specific examples of the hydrogen-containing silicon compound with larger reaction heat than $SiCl_4$ are $SiHCl_3$, $SiH_2Cl_2$, $SiH_3Cl$ and $SiH_4$. These compounds may be used as such or as a mixture of two or more of them. Further, the hydrogen-containing silicone compound may bes used as a mixture with $SiCl_4$. For example, hydrolysis or combustion of $SiHCl_3$ and $SiH_4$ may proceed as follows:

$$SiHCl_3 + H_2O \rightarrow SiO_2 + HCl \qquad (II)$$

$$SiH_4 + O_2 \rightarrow SiO_2 + H_2 \qquad (III)$$

The reaction heats are 118 kcal/mol and 339 kcal/mol in the reaction (II) and (III), respectively, and are both far larger than heat of hydrolysis of $SiCl_4$ and large enough to continuously proceed the reactions. Therefore, when such hydrogen-containing silicon compound is used as the glass raw material, since it is not necessary to proceed the synthesis of the fine glass particles by the aid of combustion heat of the fuel gas and the fine glass particles can be heated at a sufficiently high temperature, the combustion heat can be used predominantly to heat the surface of the deposited glass particles and thus the bulk density of the porous soot preform is easily controlled irrespective of the reaction of the glass raw material. As the result, the deposition rate of the fine glass raw material is increased.

According to the method of the present invention, the first center burner may be used to form a core portion having a higher refractive index, and the second burner(s) may be use to form a cladding portion having lower refractive index.

In the present invention, the jetting rates of the fuel gas, the glass raw material and the optionally used additive are substantially the same as in the conventional vapor phase method, particularly, the vapor phase axial deposition method.

The heating and sintering of the porous soot preform is carried out by a per se conventional manner, for example, at a temperature of at least 1,600° C. in an atmosphere of an inert gas (e.g. helium). In the sintering step, an additive (e.g. $SF_6$, $CF_4$, $CCl_2F_2$, $SiF_4$, $BF_4$, $BCl_3$, etc.) may be added to adjust the refractive index of the transparent glass preform. The additive may be jetted from either of the first or second burner or from both burners.

The present invention will be hereinafter explained further in detail by following Examples.

COMPARATIVE EXAMPLE

Figure 1:
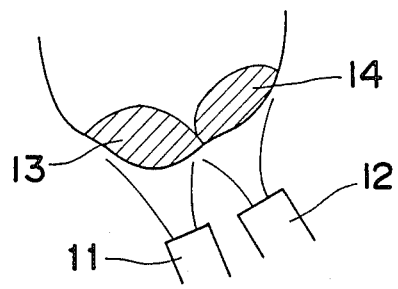
FIG. 1 schmatically shows a method for synthesizing and depositing fine glass particles in which two burners are used.
Figure 2:
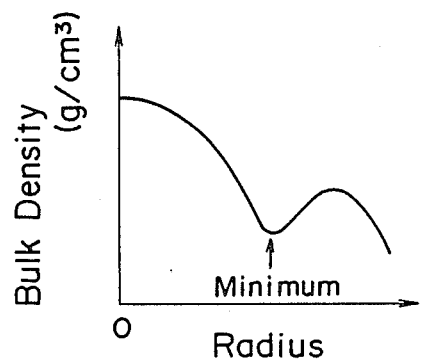
FIG. 2 shows the bulk density distribution in a radial direction of a porous soot preform produced by a conventional vapor phase method.

By means of the burners 11 and 12 as shown in FIG. 1, a porous soot preform was produced from $SiCl_4$. As the burners 11 and 12, the same coaxial multi-nozzle burners were used.

Flow rates for the burners 11 and 12 were as follows:

| Burner 11 | |
|---|---|
| (for the center portion of the preform) | |
| $SiCl_4$ | 600 ml/min. |
| $GeCl_4$ | 105 ml/min. |
| Hydrogen | 10 l/min. |
| Oxygen | 12 l/min. |
| Argon | 2.7 l/min. |
| Burner 12 | |
| (for the peripheral portion of the preform) | |
| Hydrogen | 20 l/min. |
| Oxygen | 20 l/min. |
| Argon | 4 l/min. |
| $SiCl_4$ | 340, 600, 820 or 1,100 ml/min. |

Figure 3:
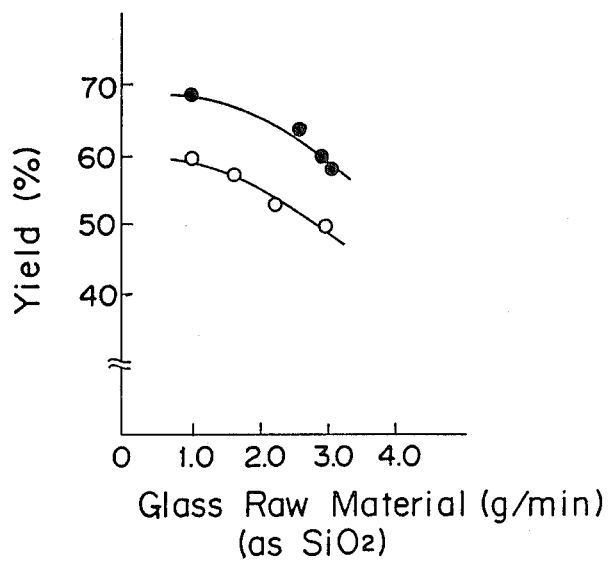
FIG. 3 shows the relationship between an amount of a glass raw material and a deposition yield.

The deposition yields (Amount of the actually deposited glass particles/Theoretical amount to be deposited based on the jetted amount of the glass raw material) of the porous soot preforms are shown in FIG. 3 by circles. In FIG. 3, the flow rate of $SiCl_4$ is calculated as $SiO_2$.

Figure 4:
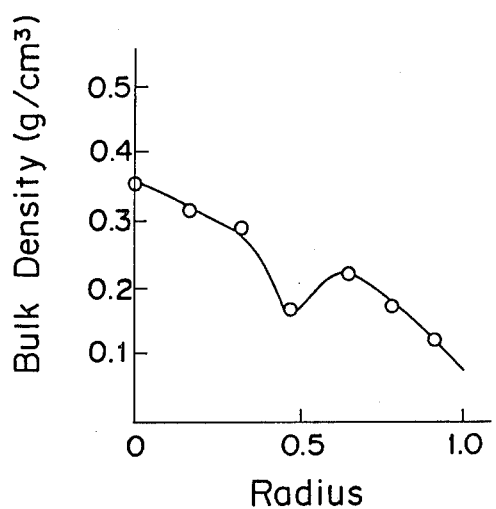
FIGS. 4 and 5 shows bulk density distributions in a radial direction of the porous soot preforms produced in Example 1 and Comparative Example, respectively.

As is seen from FIG. 3, the deposition yields scatter between 50 and 60%. When the flow rate of $SiCl_4$ from the second burner was 1,100 ml/min., the soot preform cracked and was not stably produced. In this case, the bulk density distribution was unstable as shown in FIG. 4 and had the minimum point.

EXAMPLE 1

In the same manner as in Comparative Example but jetting $SiHCl_3$ from the second burner 12 at following flow rates, a soot glass preform was produced:

| | |
|---|---|
| Hydrogen | 12 l/min. |
| Oxygen | 20 l/min. |
| Argon | 4 l/min. |
| $SiHCl_3$ | 340, 970, 820, 1,100 or 1,120 ml/min. |

The deposition yields are shown in FIG. 3 as black circles, which are about 10% larger than those in Comparative Example and scatter between 56 to 68%.

Figure 5:
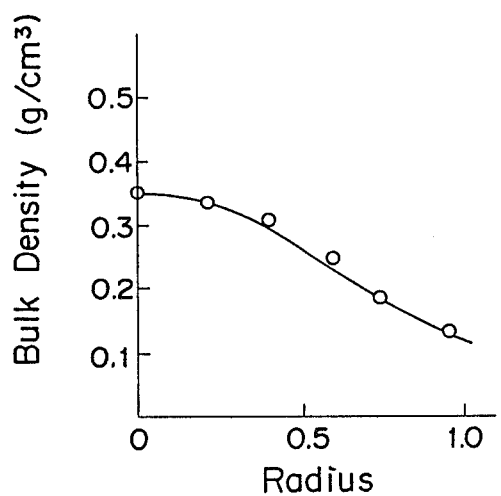

In this example, when $SiHCl_3$ was jetted at 1,100 ml/min or higher, the porous soot preforms were stably produced. The bulk density distribution is smooth and stable as shown in FIG. 5.

EXAMPLE 2

In the same manner as in Comparative Example but flowing the gasses at the following rates, a porous soot preform was produced:

| Burner 11 | |
|---|---|
| $SiCl_4$ | 600 ml/min. |
| $GeCl_4$ | 105 ml/min. |
| Hydrogen | 10 l/min. |
| Oxygen | 12 l/min. |
| Argon | 2.7 l/min. |
| Burner 12 | |
| Hydrogen | 16 l/min. |
| Oxygen | 20 l/min. |
| Argon | 4 l/min. |
| $SiCl_4$ | 600 ml/min. |
| $SiHCl_3$ | 340 ml/min. |

The deposition yield was 61%.

We claim:

1. A method for producing a glass preform for an optical fiber having a core portion and a cladding portion by means of separate burners, said method comprising jetting a first component stream from a first burner, said first stream including a glass raw material consisting of $SiCl_4$, and jetting a second component stream from a second burner, said second stream including a second glass raw material consisting of a compound or mixture of compounds selected from the group consisting of $SiHCl_3$, $SiH_2Cl_2$, $SiH_3Cl$ and $SiH_4$, flame hydrolyzing the glass raw materials to synthesize fine glass particles, depositing the fine glass particles onto a starting member having a longitudinal axis to form a porous soot preform, and heating and sintering the soot preform to obtain a transparent glass preform, wherein the first burner is used to form said core portion and said second burner is used to form said cladding portion, and said soot particles are deposited and grown in a direction parallel to the direction of the axis of said starting member.

2. A method according to claim 1, wherein the core portion of the porous preform has a higher refractive index than the cladding portion.

* * * * *